Figure 1A:
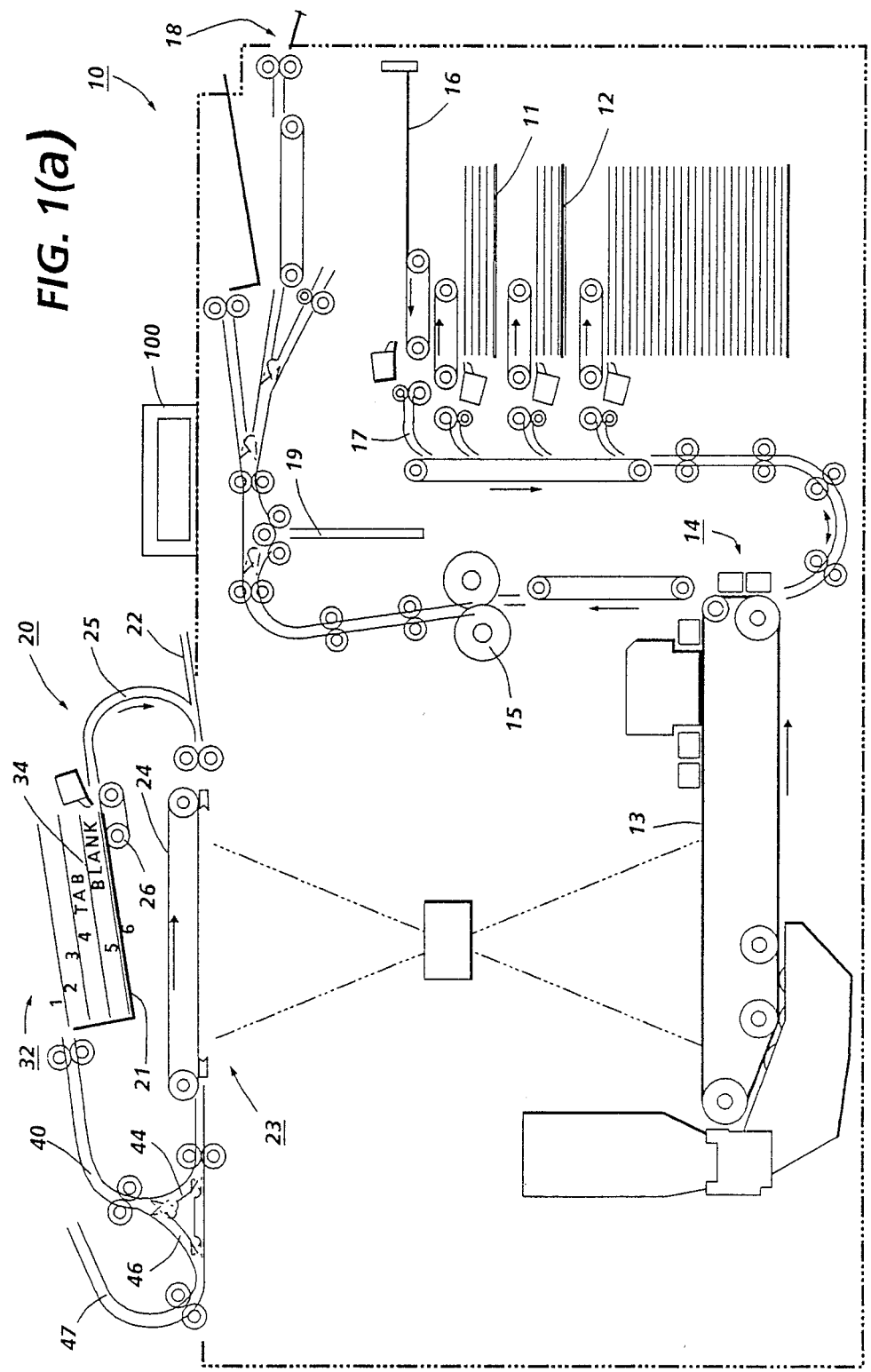

United States Patent [19]

Rabb et al.

[11] Patent Number: 4,974,035
[45] Date of Patent: Nov. 27, 1990

[54] AUTOMATIC DUPLEX COPYING WITH INTERLEAVED TABS

[75] Inventors: Khalid M. Rabb, Webster; Robert E. Crumrine, Fairport, both of N.Y.

[73] Assignee: Xerox Corporation, Stamford, Conn.

[21] Appl. No.: 445,819

[22] Filed: Dec. 4, 1989

[51] Int. Cl.$^5$ ............................................. G03G 21/00
[52] U.S. Cl. .................................... 355/320; 355/309; 355/325
[58] Field of Search ............... 355/320, 325, 318, 319, 355/309; 271/278, 291

[56] References Cited

U.S. PATENT DOCUMENTS

| | | | |
|---|---|---|---|
| 4,184,671 | 1/1980 | Sasamori | 355/320 X |
| 4,211,483 | 7/1980 | Hannigan et al. | 355/325 X |
| 4,212,457 | 7/1980 | Guenther | 271/288 |
| 4,248,528 | 2/1981 | Sahay | 355/14 |
| 4,278,344 | 7/1981 | Sahay | 355/14 |
| 4,579,326 | 4/1986 | Pinckney | 271/3.1 |
| 4,609,282 | 9/1986 | Crandall | 355/325 |
| 4,640,607 | 2/1987 | Bray | 355/14 |
| 4,681,428 | 7/1987 | Devoy | 355/325 X |
| 4,763,161 | 8/1988 | Forest et al. | 355/14 |
| 4,819,021 | 4/1989 | Doery | 355/13 |

FOREIGN PATENT DOCUMENTS 0041301 12/1981 European Pat. Off. ............ 355/320

*Primary Examiner*—A. T. Grimley
*Assistant Examiner*—Thu A. Dang

[57] ABSTRACT

A tab copying system for a duplexing copier with a recirculating duplex document handler (RDH), in which a set of duplex (two sided) original document sheets may be loaded, recirculated, and inverted during circulations for making plural duplex (two sided) copy sheets from both sides, by temporarily storing first side copies in a duplex buffer tray of the copier and feeding them out from the duplex tray for copying the second sides. The disclosed system allows loading simplex (one sided) original documents for making tab copies therefrom (called tabbing originals) intermixed with the duplex document sheets into the RDH in a normal sheet orientation and in the desired order. The tabbing originals are circulated for copying together with the duplex document sheets, but the RDH is specially controlled so that the tabbing originals are not inverted, but the duplex documents are, and the tabbing originals are copied only onto the first sides of copy sheets not fed from the duplex tray, to make simplex tab copies, and these simplex tab copies are fed out of the copier properly interleaved with the duplex copy sheets made from the duplex document sheets in a preselected order. That is preferably the same order in which the simplex tabbing originals were loaded intermixed with the duplex document sheets into the RDH. Preferably the set of duplex document sheets is copied on their first and second sides in different, respective, alternating, circulations by the RDH, and the tabbing originals are circulated therewith in both cases, but only copied during the second side copying circulations, to properly interleave the tabs with the copies. Each tabbing original may be electronically tagged with preprogrammed exception information not be inverted.

7 Claims, 8 Drawing Sheets

AUTOMATIC DUPLEX COPYING WITH INTERLEAVED TABS

The present invention relates to the convenient automatic providing of printed tab copy sheets within the output of copy sheets of a copier, fed through the regular copy sheet (paper) path of a xerographic or other photocopier, and printed by the copier.

There is disclosed herein an improvement in original document handling and duplex copying for copiers, in which original documents for making tabs can be intermixed with regular or conventional duplex (two sided) originals and duplex copied in a conventional duplexing copier to provide the tabbed copies interleaved in the desired order or positions. The present system is usable with commercially available copiers with conventional and/or commercially available recirculating document handlers (RDH's).

The present system enables simplified tabbed copy sets creation by an unskilled operator, automatically. It allows conventional or other pre-cut tab stock to be conventionally loaded into and utilized by the copier, and to have "labels" printed on the tabs thereof (and any other desired text or information printed at any other sheet location) by the copier, from regular document sheets (originals), without special operator manual handling or loading orientation restrictions of either the tab stock or the originals from which the tabs are to be printed. The present system allows and encourages casual operator printing of copy sets with printed tab inserts by eliminating the difficulty and complexity of requiring the operator to make special manual page order placements, orientations, etc.

The tab-printed copy sheets produced by the disclosed system can be generated and treated as simplex documents rather than duplex documents, thus reducing their sheet handling and eliminating the undesirable feeding of tabbed stock copy sheets (which may be oversize, and/or have easily damaged tab extensions) into and out of the copier duplex tray and its feeder. Internal tab cutting, as in Xerox Corporation U.S. Pat. No. 4,819,021, is not required either.

Along with the general increases in speed and capabilities of modern copiers, there has been provided collated output in collated copy sets, and the availability of programming special copying treatment of certain selected documents, by operator input preprogramming and/or marked or special insert or slip sheets ahead of or at selected positions in the output copy sets. Some examples of art on this subject in general includes XDJ Vol. 11, No. 1, pp. 41-42, Jan./Feb. 1986 by Robert J. Michatek, XDJ Vol. 7 No. 1 p. 7 Jan./Feb. 1982 and XDJ Vol. 7, No. 6, p. 359 Nov./Dec. 1982 by Thomas Acquaviva; XDJ Vol. 6, No. 4, p. 169-70 July/Aug. 1981 by Denis J. Stemmle; U.S. Pat. No. 4,126,390 issued Nov. 21, 1978 to John. L. Connin, and U.S. Pat. No. 4,693,590 issued Sept. 15, 1987 to S. Umeda (Ricoh Company). U.S. Pat. No. 4,310,235 to Lorenzo et al, is noted re separately machine readable job card programming for a copier.

Referring to prior art on marked slip sheet special programming, by reading and non-copying the slip sheets as they are fed to an RDH intermixed with regular original sheets, this is particularly the subject of Xerox U.S. Pat. No. 4,248,528 issued Feb. 3, 1981 to R. Sahay.

An early example of copier job programming sheets is Ricoh U.S. Pat. No. 3,687,540 issued Aug. 29, 1972 to H. Hashimoto—note FIGS. 2-3. The even earlier 1964 German patent of addition No. 1,156,314 to Helmut Rankers discloses an opaque or metalized control sheet pasted onto the last sheet in a stack of originals being recirculatively copied for automatic sensing for document recirculation count. Also noted is a "Research Disclosure" publication No. 18348 of July 1979 re marking certain originals with invisible dyes or inks sensed by a special scanner in the document handler to signal control logic to alter copier parameters. EK U.S. Pat. No. 4,777,510 relates to recognizing color marked areas of originals for special processing.

Additional prior art relating to special programming in general includes the earlier Eastman Kodak copiers "star" or asterisk button programming system, which can be used for chapterization, etc., as described in U.S. Pat. No. 4,640,607 issued Feb. 3, 1987 to R. L. Bray, originally filed Dec. 27, 1983, and the alternative EK "300" copier exception slip sheet insert option introduced in June 1986. As understood, for the latter, special slip sheets have a cut-out at the top. When inserted in the stack behind the original to be "excepted", and run through the RDH, this slip sheet can program that selected original to be copied onto paper fed from a different tray. When this slip sheet is turned over so that the hole is at the bottom, that following original is programmed to be skipped (not copied). The slip sheet itself is not copied, but is ejected into the SADH exit tray. See EK U.S. Pat. No. 4,763,161.

Specifically, the providing of separating tab sheets located within, and/or as the covers of, the collated copy sheet sets, especially with tabs printed by the copier itself, has become a desirable feature.

Of particular interest as an example of a prior art patent application publication relating to copier tab printing is Eastman Kodak EPO No. 0 208 324, published Jan. 14, 1987, based on U.S. Ser. No. 754,312 filed July 12, 1985.

However, heretofore the providing of tab sheets for the collated copy sheet sets has apparently required the special restricted loading and handling of precut tab sheets and the originals from which they are copied, especially for variable position tabbing duplex copying. Furthermore, if a copier or document feeder jam occurs in such a specially manually arranged job run, job recovery is difficult without mixing up or interrupting the desired order or location of the tabbed copy sheets, and/or subsequently printing the wrong titles on the wrong tabs, or in the wrong location, or not at all, or misbinding, or the like.

The terms document, document sheet, or original, are used basically interchangeably in the descriptions herein, as referring to real, conventional, physical sheets of paper or the like sheet materials, usually flimsy, and usually but not necessarily image bearing. [They may be either a true original or a previous copy being used as an original, sometimes called a "make ready".] Unless specifically so indicated, they are not referring to electronic images, which are much more easily reordered and presented for copying than such real documents. Likewise, the respective "page" numbers illustrated on one side of a document and copy sheet here are not necessarily physical page numbers, they are explanatory visualizations of page order and/or controller count indicators. The term "document" here (and its first or second side or page number in the case of a duplex document) refers to the sheet or page (either an original or a previous copy being used as an original) being copied on the copier onto the corresponding "copy sheet", or "copy". Plural sheets of documents or copies being copied in one set or job, usually, but not necessarily collated, are referred to herein as a "set". A "simplex" document or copy sheet is one having an image or "page" on only one side or face of the sheet, whereas a "duplex" document or copy sheet has a "page", and normally an image, on both (first and second) sides. The terms "first" and "second" sides are used herein for the opposite sides of a duplex document or copy sheet, and is consistent within a particular document set, but these terms are not intended or limited to "odd" vs "even" page sides, nor, unless specified, does this necessarily mean the order in which one particular set of sides is copied vs the other sides.

The present invention is particularly suitable for pre-collation copying, i.e., automatically plurally recirculated document set copying provided by a recirculating document handling system (RDH). However, the disclosed system also has applicability to post-collation (non-pre-collation) copying, either by post-collation operation of an RDH or normal operation of a separate or integral semiautomatic document handler (SADH), or a non-recirculating automatic document feeder (ADF), with or without a connecting multi-bin sorter. These alternate copying systems are known in the art, including various references cited herein.

Specifically, there is Xerox Corporation prior art on the basic concepts of a copier having both an RDH and a sorter, in combination, and with so-called "limitless sorting". Xerox Corporation U.S. Pat. No. 4,212,457, issued July 15, 1980 to J. Guenther, and U.S. Pat. No. 4,757,356 issued July 12, 1988, disclose RDH/sorter combinations. Said U.S. Pat. No. 4,212,457 to J. Guenther teaches switching between pre-collation and post-collation copying on the same apparatus, and in the paragraph bridging Cols. 1 and 2 specifically refers to post-collation limitless sorting with reference to cited Xerox Corporation U.S. Pat. No. 3,944,207 issued Mar. 16, 1976 to S. S. Bains on "limitless sorting". Limitless sorting is a known copying mode alternately using two sets of sorter bins, one of which sets of bins can be filled while the other set of bins is being unloaded, as explained in said U.S. Pat. Nos. 4,212,457 and 3,944,207. Said U.S. Pat. No. 4,212,457 to J. Guenther also teaches forward or reverse (1−N or N−1) copying order (Col. 1 lines 23 and 44-45, and Col. 4 lines 43-45 (the latter also mentioning duplex copying)), and cites an RDH which is an N−1 feeding order type (U.S. Pat. No. 4,078,787 cited at Col. 2 line 25), although the illustrated RDH 10 of said U.S. Pat. No. 4,212,457 is apparently a 1−N order document feeding type.

Also of particular interest as relating to the subject of "limitless sorting" is U.S. Pat. No. 4,361,320 issued Nov. 30, 1982 to H. Kikuchi, et al.. It discloses a single vertical array of bins divided (functionally) into two groups when the number of copies to be collated exceeds the number of bins, thus allowing copying to operate continuously and allowing an operator to remove the collated copies from one group while copies are being collated in the other group. When the number of pages of a document exceeds a predetermined number, the first group is defined to contain more bins than the second group, thereby reducing the number of times each document page must be fed to the copier. A. J. Botte, et al., U.S. Pat. No. 4,285,591 issued Aug. 25, 1981 to IBM, is also programmed to automatically segment the collator job when the number of document sets desired exceeds the capacity of the collator.

It is important to keep in mind the important known differences between pre-collation and post-collation copying in automatically making plural collated sets of copies of a set of documents. Pre-collation copying does not require a sorter or collator for collating the copy output. The copy sets come out already collated and these completed sets may be put directly into an output stacker and/or finisher. However, pre-collation with physical documents requires a recirculating document handler (RDH) to plurally recirculate the document set, since normally only one (or two) copy sets are produced per circulation of the document set. In contrast, in post-collation copying plural copies can be made in direct sequence from each document (or 2-up document pair) in a single presentation to the copying station, but then sorting (collation) of the output copies is required. Duplexing requirements likewise differ between the two copying systems.

Some examples of Xerox Corporation RDH Patents are U.S. Pat. Nos. 4,278,344 issued July 14, 1981 to R. B. Sahay; 4,459,013 issued July 10, 1984 to T. J. Hamlin et al; 4,428,667; 4,621,801, 4,579,444, 4,579,325 and 4,579,326 (similar to the RDH shown herein); and 4,794,429. Some other examples of recirculating document handlers are disclosed in U.S. Pat. Nos. 4,076,408; 4,176,945; 4,428,667; 4,330,197; 4,544,148; 4,462,527; and 4,466,733, and other art cited therein.

It is important to note that in a conventional or "racetrack" RDH, such as primarily cited above, that the documents are restacked after copying on top of the stack of documents in the RDH document tray, and are fed out for copying from the bottom of the stack. This limits the document copying order to the N−1 order in which the set of documents are loaded into the RDH tray (N to 1 from bottom to top, with page 1 face up and on top, and therefore fed last by the bottom feeder). This also limits and controls the duplex copying sequencing in comparison to a so-called "immediate duplex" document handler in which a duplex document sheet can be inverted and immediately returned back to the platen to copy the second side immediately after the first side, rather than waiting for another circulation of the entire document set to get that same document back to the platen again.

The present invention is particularly suitable for copiers providing automatic duplex copying using dedicated duplex buffer trays in which the intermediate simplexed copies are temporarily stored. Some examples of art on duplex tray duplexing pre-collation include, in addition to some of the patents above, Xerox Corporation U.S. Pat. Nos. 4,330,197 to Smith et al; 4,782,363 to Britt et al; and art cited therein. The above-cited U.S. Pat. No. 4,278,344 to R. B. Sahay is of particular interest as disclosing plural partial or buffer copy sets (first side copies) in the duplex buffer tray, the number of said plural buffer sets being a function of the total or maximum effective sheet capacity of that tray and a divisor of the number of duplex document sheets in the document set being recirculatively copied.

In said normal prior duplex document duplex copying systems, all the documents in the document set being copied are inverted by the RDH during one circulation of the document set. It is assumed by the copier controller that all the documents in the document set are duplex documents requiring inversion to copy both their first and second sides. Also, in said prior duplex document duplex copying systems normally all the documents in the document set are being copied on one side thereof in each circulation. (at least, after the first circulation, which in some systems is a non-copying inverting and/or precounting circulation).

On-line finishing of the outputted collated copy sets by stapling, stitching or glue binding is another known feature of modern high speed copiers. Examples of these and other modern pre, post or post collated output system features are disclosed, for example, in U.S. Pat. No. 4,782,363 issued Nov. 1, 1988 and filed Sept. 17, 1987 by James E. Britt, et al and prior art references cited therein, and elsewhere herein, and in the Xerox Corporation "5090" "9900" and "1090" copiers.

As to control systems, some examples of various other prior art copiers with document handlers with control systems therefor, including document sheet detecting switches, sensors, etc., are disclosed in U.S. Pat. Nos.: 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344; 4,284,270, and 4,475,156. In an RDH a document set separator conventionally counts document set recirculations by signaling each time the last sheet of the set is fed, e.g., U.S. Pat. No. 4,589,645. It is well known in general and preferable to program and execute document handler and copier control functions and logic with conventional software instructions for conventional microprocessors. This is taught by the above and other patents and various commercial copiers. Such software may of course vary depending on the particular function and the particular software system and the particular microprocessor or microcomputer system being utilized, but will be available to or readily programmable by those skilled in the applicable arts without undue experimentation from either the provided verbal functional descriptions, such as those provided herein, or prior knowledge of those functions which are conventional, together with general knowledge in the software and computer arts. Controls may alternatively be provided utilizing various other known or suitable hardwired logic or switching systems.

The present invention overcomes various of the above-discussed and other problems, and provides various of the above-noted and other features and advantages.

A specific feature of the specific embodiment disclosed herein is to provide a method of copying a set of duplex (two sided) original document sheets with a recirculating document handler on a duplexing copier for making plural duplex (two sided) copy sheets, by loading the duplex document sheets into said recirculating document handler and circulating the document sheets to and from the copying station of the copier and automatically inverting the duplex document sheets to copy both their first and second sides with said recirculating document handler, and making duplex copies by temporarily storing first side copies in a duplex buffer tray of the copier and feeding them out from said duplex buffer tray for copying the second sides thereof, the improvement comprising: loading simplex (one sided) original documents for making tabs (hereinafter called tabbing originals) intermixed with said duplex document sheets into said recirculating document handler in a normal sheet orientation and circulating said tabbing originals for copying together with said duplex document sheets with said recirculating document handler, but controlling the recirculating document handler so that said tabbing originals are not inverted in copying circulations of the document sheets, and copying said tabbing originals onto only the first sides of copy sheets not fed from said duplex buffer tray to make simplex tab copies, and feeding said simplex tab copies interleaved with said duplex copy sheets made from said duplex document sheets in a preselected order.

Further specific features provided by the system disclosed herein, individually or in combination, include those wherein said preselected order is the same order as said tabbing originals were loaded intermixed with said duplex document sheets into said recirculating document handler; wherein each said tabbing original is tagged with preprogrammed exception information not be inverted during copying circulations of said recirculating document handler even though intermixed with said duplex document sheets being inverted; wherein said set of duplex document sheets is copied on their first and second sides in different, respective, alternating, circulations by said recirculating document handler; and/or wherein said tabbing originals are circulated but not copied with said first side copying circulations of said set of duplex document sheets, and are circulated and copied in said second side copying circulations of said set of duplex document sheets, to provide said feeding of said simplex tab copies interleaved with said duplex copy sheets made from said duplex document sheets in a preselected order.

Further disclosed is a method of copying simplex document sheets, which are providing tabbing originals, and which are intermixed in a preselected order with duplex original documents sheets, onto simplex tab copy sheets intermixed with duplex copy sheets of said duplex original documents sheets, comprising commonly recirculating all said document sheets and inverting said duplex documents sheets to make duplex copies thereof, but not inverting said tabbing originals and making simplex tab copies therefrom, and wherein said tabbing originals are circulated but not copied with said first side copying circulations of said set of duplex document sheets, but are circulated and copied in said second side copying circulations of said set of duplex document sheets, to produce said simplex tab copies interleaved with said duplex copy sheets in a preselected order; wherein said preselected order is the same order as said tabbing originals are interleaved with said duplex document sheets and commonly loaded therewith in that order into a recirculating document handler for a copier; and/or wherein each said tabbing original is tagged with preprogrammed exception information not be inverted during copying circulations even though intermixed with said duplex document sheets being inverted.

All references cited in this specification, and their references, are incorporated by reference herein where appropriate for appropriate teachings of additional or alternative details, features, and/or technical background.

Figure 1B:
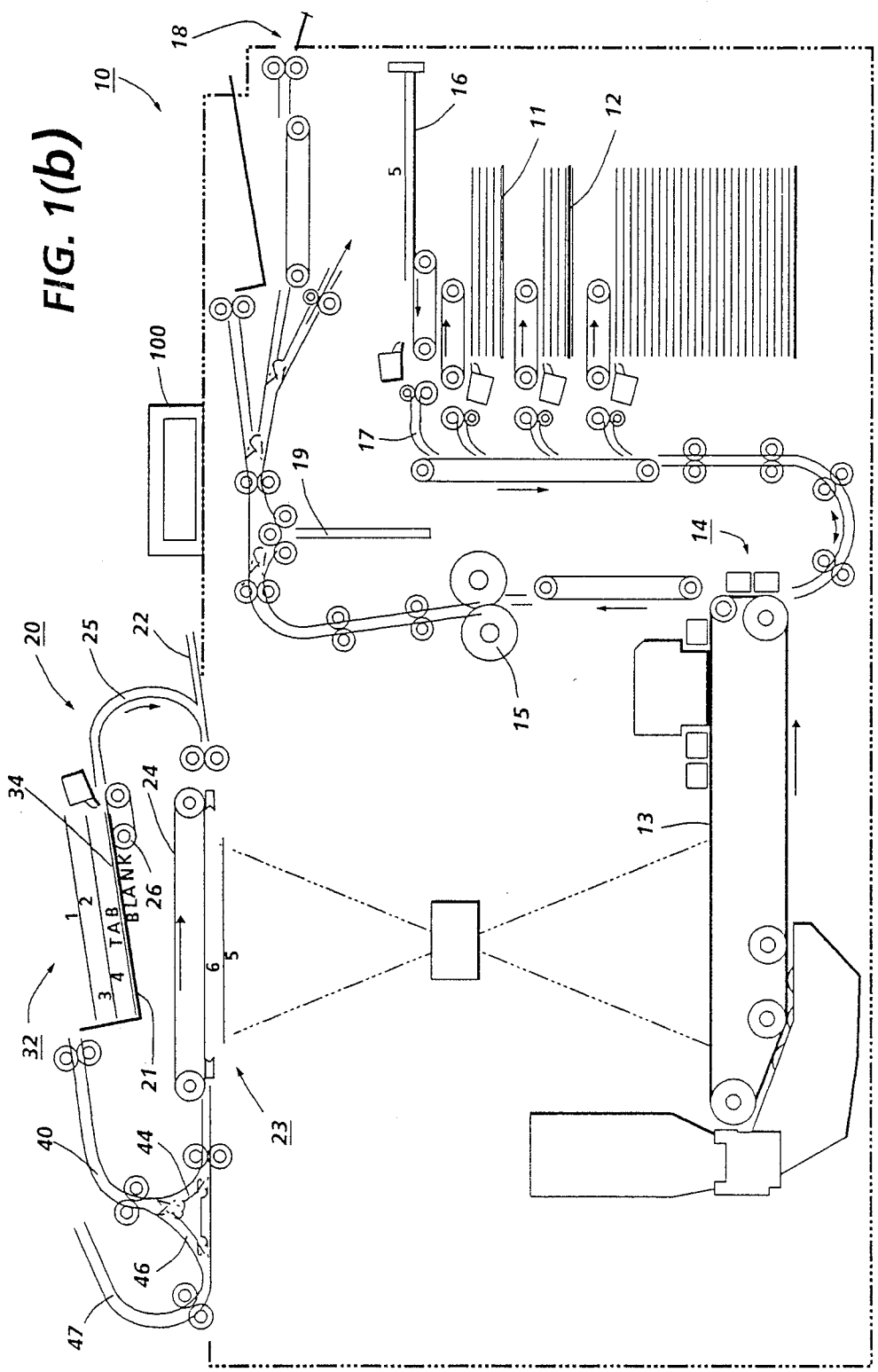
Figure 1C:
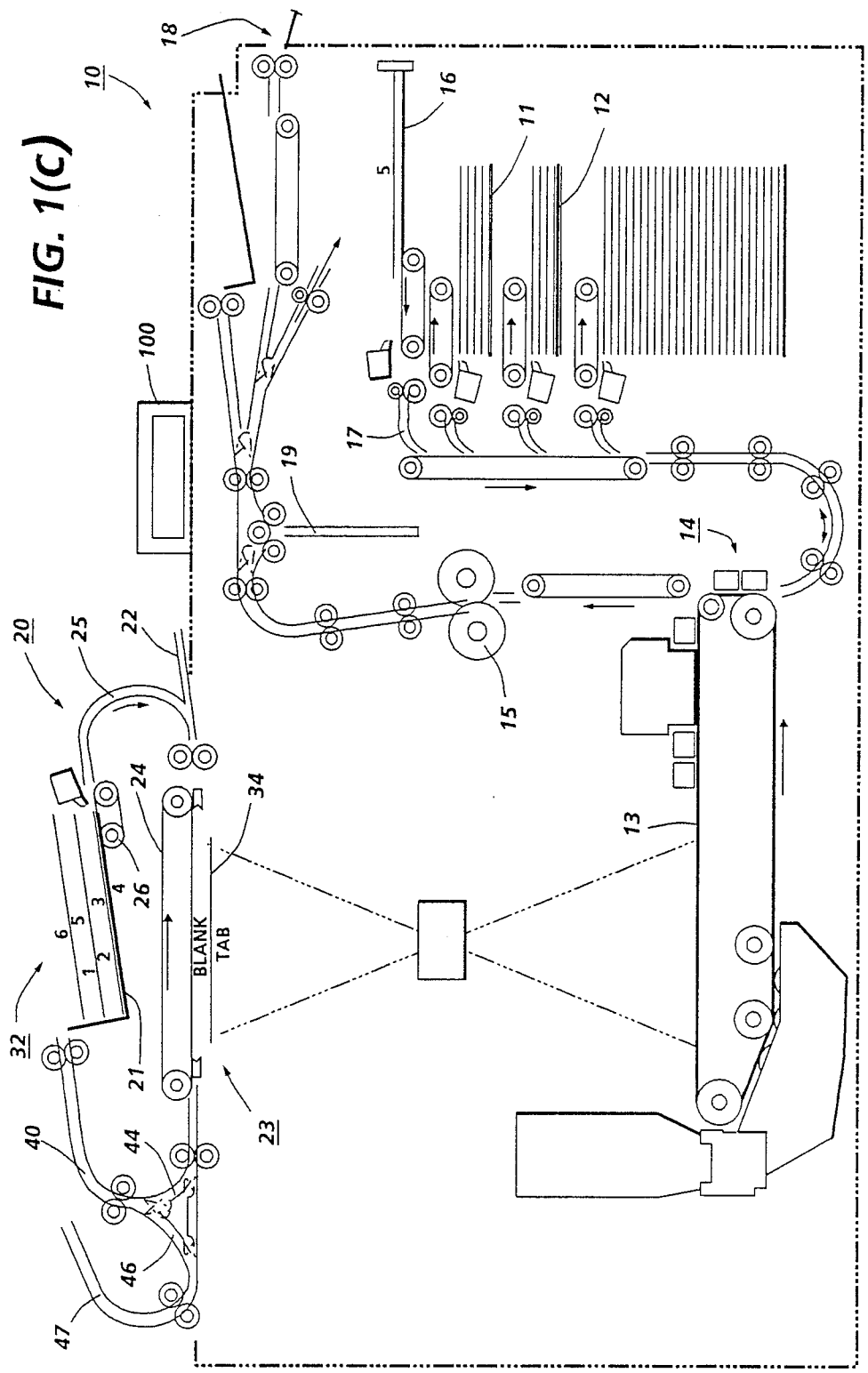
Figure 1D:
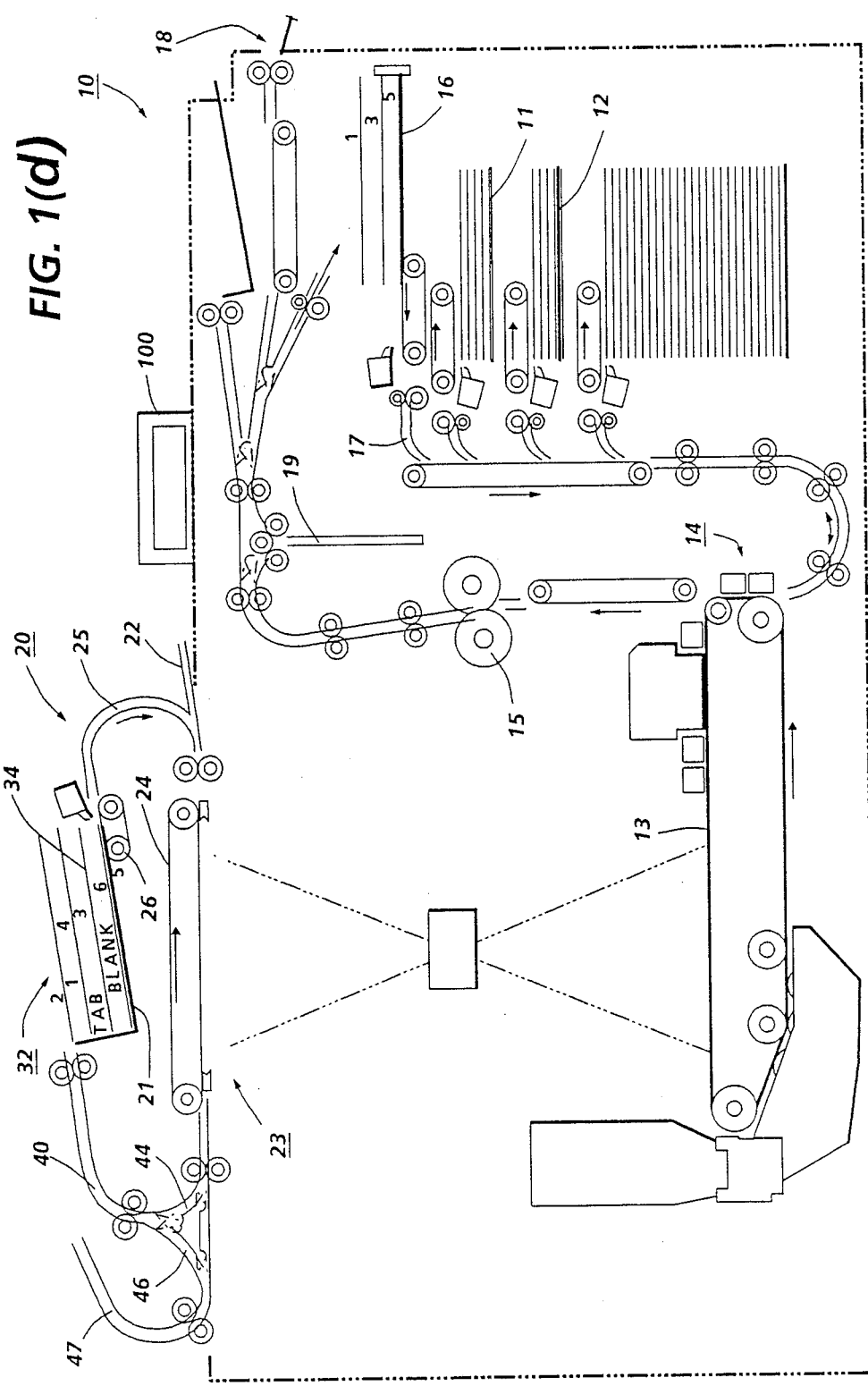
Figure 1E:
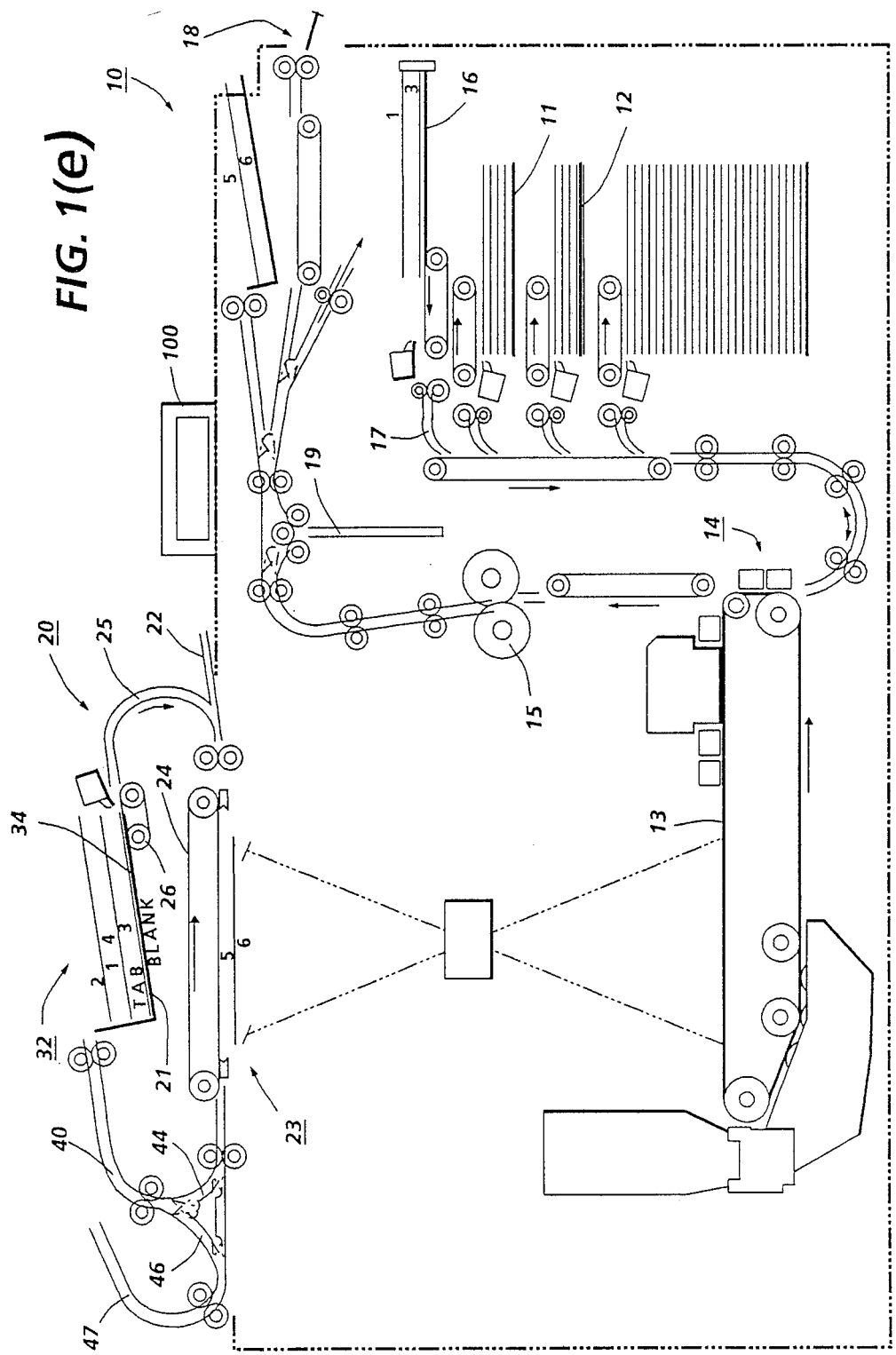
Figure 1F:
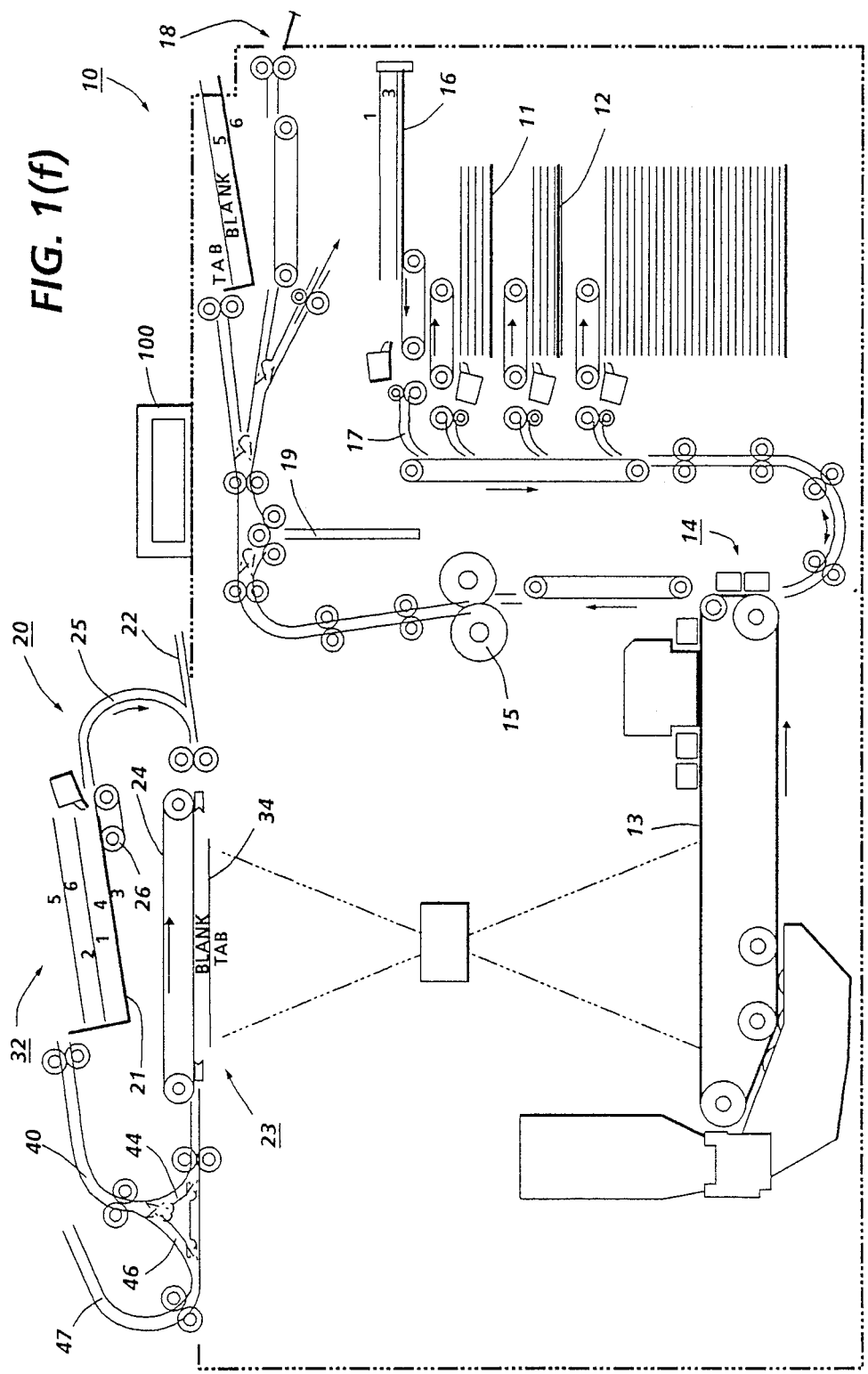
Figure 1G:
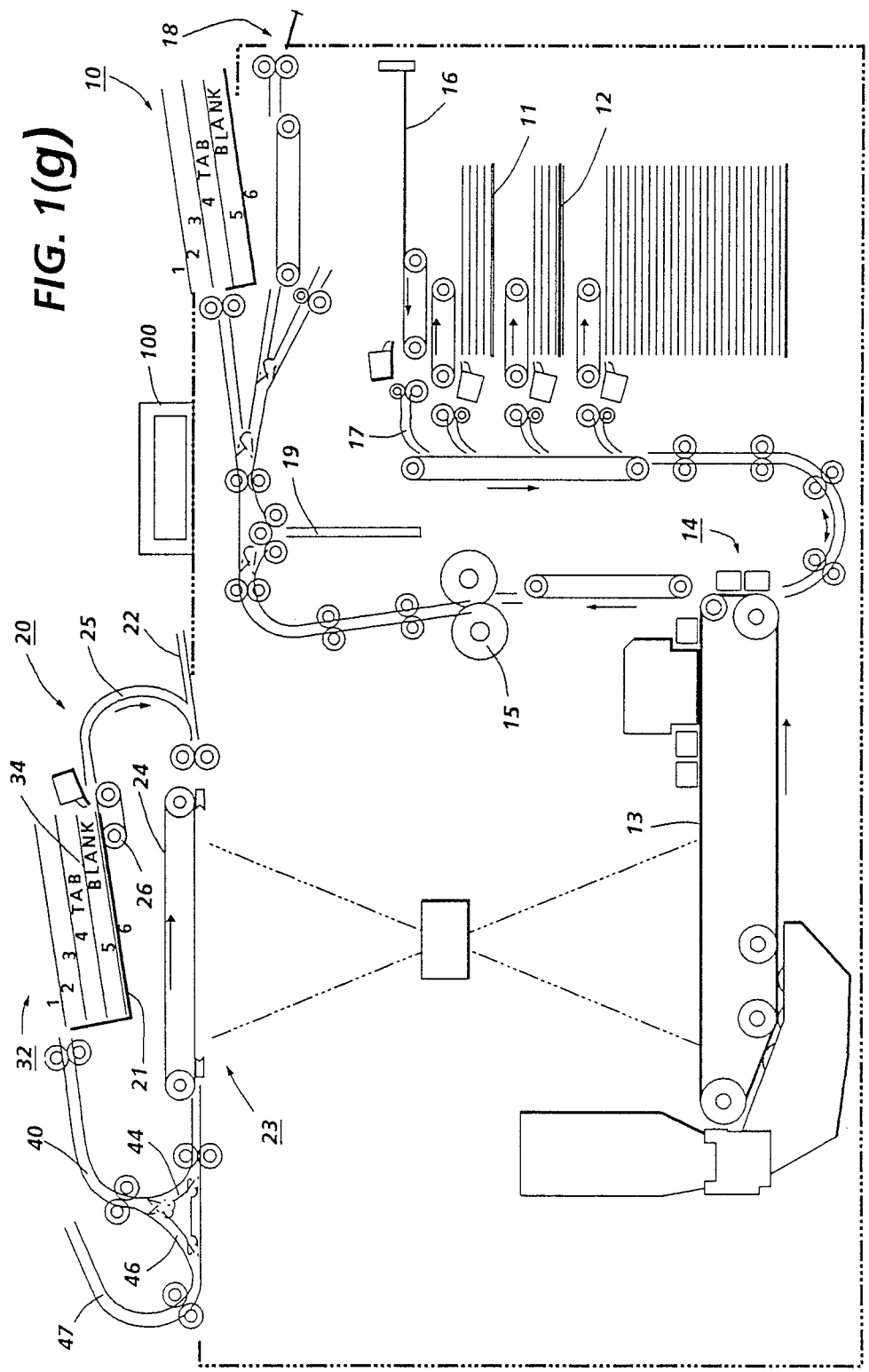
Figure 2:
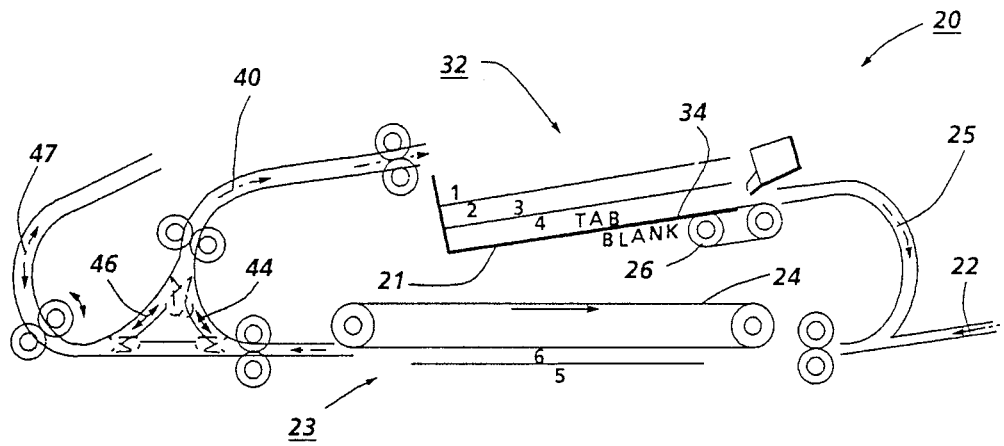

Various of the above-mentioned and further features and advantages of the invention will be apparent from the apparatus and its operation described in the specific example below. Thus, the present invention will be better understood from the following description of this exemplary embodiment thereof, including the drawing figures (approximately to scale) wherein:

FIG. 1 is a schematic frontal view of an exemplary copier, with an exemplary RDH, illustrating one operating example of the subject tab generating system, for one exemplary set of duplex documents with an intermixed tabbing original document, with the successive steps of copying respectively shown in sub-FIGS. 1(a)-1(g); and FIG. 2 is an enlarged view of the RDH of FIG. 1 in the FIG. 1(b) operating position.

Describing now in further detail the specific example illustrated in the Figures, there is schematically shown in FIG. 1, (in repeated, otherwise identical, views), an exemplary copier 10, with an exemplary recirculating document handler (RDH) 20, in various stages or steps of an exemplary operation providing one example of the subject tab generating system. Both the copier 10 and RDH 20 are of a generally known type further described in art cited herein.

The exemplary copier 10 may be, for example, the well known Xerox Corporation "1075" or "1090" copiers, as illustrated and described in various patents cited above and otherwise, including U.S. Pat. No. 4,278,344, or various other xerographic or other copiers. Such a copier 10 is preferably adapted to provide in a known manner duplex or simplex collated copy sets from either duplex or simplex original documents circulated by the RDH 20. As is conventionally practiced, the entire document handler unit 20 may pivotally mount to the copier so as to be liftable by the operator up away from the platen for alternative manual document placement and copying.

The exemplary copier 10 and RDH 20 may alternatively be of various other similar or known types, such as are disclosed in above-cited patents. For example, the exemplary DH 20 structure illustrated here may be like that shown in U.S. Pat. No. 4,794,429 issued Dec. 27, 1988 to T. Acquaviva, or U.S. Pat. No. 4,731,637 issued Mar. 15, 1988 to T. Acquaviva and T. R. Cross. This general type of RDH is also shown in various cited and other patents thereon such as U.S. Pat. No. 4,579,444, etc..

For illustrative clarity here, the exemplary document and copy sheets in the various different steps or modes are all drawn here with exaggerated spacing between the document and copy sheets being stacked. In actual operation these stacked sheets would be directly superposed.

The RDH 20 provides for automatically feeding or transporting individual registered and spaced document sheets onto and over the imaging station 23, i.e., over the platen of the copier 10. For illustrative clarity here a platen is not illustrated in this schematic figure. The platen transport system 24 may be an incrementally servo motor driven non-slip or vacuum belt system controlled by the copier controller 100 in a manner taught by above-cited references to stop the document at a desired registration (copying) position.

The RDH 20 here (see FIG. 2) has the conventional "racetrack" document loop path configuration, and preferably has generally known per se inverting and non-inverting return recirculation paths to the RDH loading and restacking tray 21. An exemplary set of duplex document sheets is shown stacked in this document tray 21. The RDH 20 is a conventional dual input RDH/SADH document handler, having an alternate semiautomatic document handling (SADH) side loading slot 22. Documents may be fed to the same imaging station 23 to be copied by the same platen transport belt 24 from either the SADH input 22 at one side of the RDH unit 20, or from the regular RDH input—the loading or stacking tray 21—on top of the RDH unit. As noted, that second input 22 is referred to herein as the SADH input 22, although it is not limited to semiautomatic document input feeding. The regular RDH document feeding input is from the bottom of the stack in tray 21 through an arcuate, inverting, RDH input path 25 to the upstream end of the platen transport 24. This input path 25 preferably includes a known stack bottom corrugating feeder-separator belt and air knife system 26, document position sensors, and a first set of turn baffles and feed rollers to naturally invert the documents once before copying.

Document inverting or non-inverting by the RDH may be as described, for example, in the above-cited U.S. Pat. Nos. 4,794,429 or 4,731,637, etc.. After the documents are copied on the platen imaging station 23, or fed across the platen without copying, they may be ejected by the platen transport system 24 into downstream or off-platen rollers and fed past a gate or gates and sensors. Depending on the positions of these gates, they either guide the documents straight out directly to a document output path to a catch tray, or, more commonly, the documents are instead deflected by a decision gate past a further sensor into an RDH return path 40 taking them back to tray 21 to restack on top of the documents then in tray 21, so that the document set can be continuously refed and recirculated. This RDH return path 40 includes reversible rollers to provide a choice of two different return paths to the RDH tray 21; a simplex return path 44 with one inversion, or a reversible duplex return path 46 without an inversion (called an inverter), as further explained below. For the duplex path 46 the reversible rollers are reversed to reverse feed the previous trail edge of the sheet back into the duplex return path 46 from an inverter chute 47 (curved in this case). This duplex return path 46 provides a desired inversion of duplex documents in one circulation, as they are returned to the tray 21, as compared to their previous orientation in tray 21, for copying their opposite sides in a subsequent circulation, or circulations, as described in the above-cited art. Normally this RDH inverted and inversion path 46, 47 is used only for RDH input tray 21 loaded documents and only for duplex documents. In normal operation a duplex document has only one inversion per circulation (occurring in the RDH input path 25). In contrast, in the simplex circulation path there are two inversions per circulation, one in each of the paths 25 and 44. Two inversions per circulation equals no inversion. Thus, simplex documents are returned to tray 21 in their original (face up) orientation via the simplex path 44, 40.

The entire stack of originals in the RDH tray 21 can be plurally recirculated and copied to produce plural collated copy sets. The document set or stack may be RDH recirculated any number of times to produce any desired number of precollated duplex copy sets. That is, sets of duplex copy sheets.

Referring further to the exemplary copier or duplicator 10 here, since such copier operation and apparatus is known and taught in the cited and other art it need not be re-explained in detail herein. Blank or clean copy sheets can be conventionally fed from paper trays 11 or 12, or the high-capacity tray input thereunder, to receive an image on their first sides from photoreceptor 13 at transfer station 14, to be fused in a fuser 15 and temporarily stacked in a duplex buffer tray 16 for subsequent return (inverted) via path 17 therefrom for receiving a second side image in the same manner as the first side. The completed duplex copy is preferably exited to an integral finishing and stacking module via output path 18. An optionally operated copy path sheet inverter 19 is also provided.

All copier and document handler and finisher operations are preferably controlled by a generally conventional programmable controller 100. The copier 10 and its RDH 20 here are additionally programmed with certain novel functions described herein. The controller 100 preferably comprises a known programmable microprocessor system, as exemplified by the above cited and other extensive prior art, e.g., U.S. Pat. No. 4,475,156 and its references. The controller 100 controls all of the machine steps and functions described herein, including all sheet feeding. This includes the actuations of the document and copy sheet feeders and inverters, gates, etc.. As further taught in the references, the controller 100 also conventionally provides for storage and comparison of the counts of the copy and document sheets, the number of documents fed and recirculated in a document set, the desired number of copy sets, and other selections by the operator through a connecting panel of numerical and other control or function selection switches. Controller information and sheet path sensors are utilized to control and keep track of the positions of the respective document and the copy sheets and the operative components of the apparatus by their connection to the controller. The controller may be conventionally connected to receive and act upon jam, timing, positional, and other control signals from various sheet sensors in the document recirculation paths and the copy sheet paths. The controller automatically actuates and regulates the positions of sheet path selection gates depending upon which mode of operation is selected and the status of copying in that mode. The controller 100 also conventionally operates and changes displays on a connecting instructional display panel portion thereof, which preferably includes said operator selection buttons or switches. Here this machine controller 100 preferably includes a known touch-screen type of operator input control and display.

A conventional document set separator in the RDH, connected to the controller 100 conventionally provides a signal indicating that the last sheet of the document set has been fed, i.e., that a single document set circulation has been completed. See, e.g., U.S. Pat. No. 4,589,645.

In the illustrated operation of the copier 10 in FIG. 1 here, for the illustrated duplex to duplex copying mode, simplex tabbed sheets are automatically provided automatically intermixed at selected positions within the stream of outputted duplex copy sheets of the copier, with an integral, on-line, modular copy sheet tab generating system, as will be discussed herein, and as shown in the sequence of FIGS. 1(a)–1(g).

In these FIGS. 1(a)–1(g), there is shown by way of one example shown in several steps, a xerographic copier type of reproducing machine 10 feeding and copying a sample interleaved or intermixed document set 32, comprising, in this example, three conventional duplex document originals numbered here ½, ¾, and 5/6, and one simplex tabbing original sheet 34. The desired tab label is printed along one margin of the first side of this sheet 34 (labeled "TAB") while the second side of this simplex tabbing original sheet 34 is blank, as indicated. Here in this example the preselected desired order or location of the tabbing original sheet 34 within this job or document set 32 is between the duplex documents paged ¾ and 5/6, i.e., at the penultimate or N minus 1 sheet location in the set, as initially loaded into the RDH 20 tray 21, as shown in FIG. 1(a).

This mixed document set 32 is conventionally loaded into the RDH 20 tray 21, and the bottom sheet is then first fed out to the imaging station 23 and copied there on its exposed side (page 5), and the copy thereof is put into the duplex tray 16, as shown in FIG. 1(b). For illustrative clarity, the copy sheet is shown immediately placed in the duplex tray 16 as its respective document is being copied, whereas in actuality several subsequent documents would be copied in the meantime, since it takes several copier pitches (copying cycles) for the document's image on the photoreceptor 13 to move thereon to the transfer station 14, and then for the copy sheet with that transferred image to feed through the paper path from the transfer station 14 through fuser 15 and into the duplex tray 16.

However, the subsequent operation here is quite different from normal duplex to duplex job or copying sequences. This is accomplished by sequentially feeding out the tab printing document sheet originals (there is only one—34—in this example) in the RDH tray 21 across the platen 23 and returning them back to the RDH tray 21 without inversion, while meanwhile also feeding the duplex originals, into which they are interleaved in the desired order or position, with the normal appropriate duplex document inversions to provide duplex copies therefrom.

Thus, referring to FIG. 1(c), although the simplex tabbing original sheet 34 is next normally fed to the platen as part of the first side copying circulation of the duplex documents, it is not copied in this circulation. It is skipped or skewed across the platen and returned back to tray 21 through the simplex return path 44. Meanwhile, the previously copied duplex document 5/6 has been returned to tray 21 through the duplex return path 46, so it is now inverted, as 6/5, in the tray 21. Next, duplex document sheets ¾ and ½ are fed and copied on their first sides 3 and 1, and returned to tray 21 inverted in the same manner as 5/6. Thus at the end of the first circulation of this documents set 32, the copier 10 appears as in FIG. 1(d).

Next, starting the second circulation of this documents set 32, as shown in FIG. 1(e), document 6/5 is again fed to the platen, where side 6 is now facing down, and is copied onto the second side of copy sheet 5 fed from the bottom of the duplex tray 16 via path 17, and this duplexed copy sheet 5/6 is outputted. Preferably this output is into a finisher or inverter which will invert it to ultimately stack with side 6 face down. Otherwise, the optional internal output path inverter 19 may be used. The inverter 19 is used here in this illustration so that the output can be shown schematically stacked properly collated directly adjacent the output 18.

Next, as shown in FIG. 1(f), the tabbing document sheet 34 is again fed, with only the "TAB" side still face down on the platen again, but this time, in this second circulation, the tab document 34 is copied, onto a blank tab stock copy sheet fed from either paper tray 11 or 12 (as preselected and pre-loaded), not from the duplex tray 16, and that printed tab stock copy sheet (marked "TAB" here) is directly outputted as a simplexed copy sheet, and not inverted as outputted, to as to stack with the printed tab side face up in this illustrated outputted copy set.

The rest of the second circulation, for documents 4/3, 2/1, proceeds as described above for 6/5, so that by the end of the second circulation, as shown in FIG. 1(g) a completed, properly tabbed output copy set is provided as shown, with the copy tab sheet in the same interleaved position in the otherwise duplex copy set as the tabbing original 34 was in the otherwise duplex original document set. [The outputted copy set is shown in the optional top output tray here in FIG. 1(g) rather than the regular output 18.]

Although this disclosed system example describes a pre-collation copying system which makes only one or two images of each originals page at a time, the system herein can also be incorporated into a post-collation copying system, wherein in one pass or circulation of the documents, multiple identical copies are of each made in direct sequence and put into a duplex buffer tray, and then in the next circulation fed out so that the other sides of the duplex documents can be copied onto all of the other sides of the copy sheets fed from the duplex tray, these uncollated duplexed copy sheets being separately placed in separate bins of a sorter or collator.

It will be appreciated that the selective tab copying and inserting provided as described here in may be automatically coordinated by the controller 100 with the type and order of documents presented for copying by the RDH 20 and copied in the connecting copier processor to provide precollated output copy sets with integral and appropriately variably positioned tabs. Although the more difficult case of duplex to duplex copying is described herein, it will be appreciated that other copying modes can be compatibly provided as well. Programming can be preselected on the copier controller by the operator, by the console switches or by special job programing insert sheets or cards coded to provide the tabbed insert sheet in the appropriate copy positions. The tab sheets are automatically inserted in their desired positions within the sheets of the copy sets without interfering with the copying or finishing operations. Thus the finished (bound) copy sets may be automatically provided with a tab array of sequentially offset tab dividers within the copy set directly at the copier output without requiring separate processing. These tab sheets may be fed continuously into the copy stream and on into the finisher for appropriate binding by the finisher without interfering with the finisher operation or requiring any modification thereof.

As noted, preferably the tab labels are printed on the copy sheets by the copier in the same copying operation. The system disclosed herein is suitable for on-line high-speed operation at substantially the full copying rate of a high-speed copier. As noted in the cited references, this can be done by utilizing a document image for the tabs which is copied and printed along one side edge of the tabbed copy sheets in the tab area. Known automatic pre-settable margin shift copying can be used so that a regular size document can be copied onto wider tab stock. A common, plural titles, document image can be optionally used with tab stock having tabs in laterally different positions, since the unselected tab titles will be eliminated by not being in the tab area of the particular tab copy sheet and therefore not printing.

The tab printing and tab sheet inserts can also be automatically tied by the controller 100 to suitable "chapterization" of the subsets of copy sheets in between the tabbed sheets. That is, automatically providing, in a known manner, the beginning of a subset on the facing page immediately following the tab insert sheet, so that the tab sheets form the beginning of chapters without inappropriately positioned blank copy sheet pages in the case of duplex copies. An example of "chapterization" is described in U.S. Pat. No. 4,640,607 issued Feb. 3, 1987 to Richard L. Bray (Eastman Kodak Company).

While the embodiment disclosed herein is preferred, it will be appreciated from this teaching that various alternatives, modifications, variations or improvements therein may be made by those skilled in the art, which are intended to be encompassed by the following claims:

We claim:

1. In a method of copying a set of duplex (two sided) original document sheets with a recirculating document handler on a copying station of a duplexing copier for making plural duplex (two sided) copy sheets, by loading the duplex document sheets into said recirculating document handler and circulating the duplex document sheets to and from the copying station of the copier and automatically inverting the duplex document sheets to copy both their first sides and second sides with said recirculating document handler, and making duplex copies by temporarily storing first side copies in a duplex buffer tray of the copier and feeding them out from said duplex buffer tray for copying the second sides thereof, the improvement comprising:

loading simplex (one sided) original documents for making tabs (hereinafter called tabbing originals) intermixed with said duplex document sheets into said recirculating document handler in a normal sheet orientation and circulating said tabbing originals for copying together with said duplex document sheets with said recirculating document handler, but controlling said recirculating document handler so that said tabbing originals are not inverted in said copying circulations of said duplex document sheets, and copying said tabbing originals onto only the first sides of copy sheets not fed from said duplex buffer tray to make simplex tab copies, and feeding said simplex tab copies interleaved with said duplex copy sheets made from said duplex document sheets in a preselected order.

2. The copying method of claim 1, wherein said preselected order is the same order as said tabbing originals were loaded intermixed with said duplex document sheets into said recirculating document handler.

3. The copying method of claim 1, wherein each said tabbing original is tagged with preprogrammed exception information not be inverted during copying circulations of said recirculating document handler even though intermixed with said duplex document sheets being inverted.

4. The copying method of claim 1, wherein said duplex document sheets are copied on their first sides and second sides in different, respective, alternating, circulations by said recirculating document handler, and wherein said tabbing originals are circulated but not copied with said first side copying circulations of said duplex document sheets, and are circulated and copied in said second side copying circulations of said duplex document sheets, to provide said feeding of said simplex tab copies interleaved with said duplex copy sheets made from said duplex document sheets in a preselected order.

5. A method of copying simplex document sheets, which are providing tabbing originals, and which are intermixed in a preselected order with duplex documents sheets, onto simplex tab copy sheets intermixed with duplex copy sheets of said duplex documents sheets, comprising commonly recirculating all said document sheets and inverting said duplex documents sheets to make duplex copies thereof, but not inverting said tabbing originals and making simplex tab copies therefrom, and wherein said tabbing originals are circulated but not copied with first side copying circulations of said duplex document sheets, but are circulated and copied in second side copying circulations of said duplex document sheets, to produce said simplex tab copies interleaved with said duplex copy sheets in a preselected order.

6. The copying method of claim 5, wherein said preselected order is the same order as said tabbing originals are intermixed with said duplex document sheets and commonly loaded therewith in that order into a recirculating document handler for a copier.

7. The copying method of claim 5, wherein each said tabbing original is tagged with preprogrammed exception information not be inverted during copying circulations even though intermixed with said duplex document sheets being inverted.

* * * * *